US010116733B2

(12) United States Patent
Amador

(10) Patent No.: US 10,116,733 B2
(45) Date of Patent: *Oct. 30, 2018

(54) SYSTEM AND METHOD FOR COLLECTING FEEDBACK IN A MULTI-TENANT COMMUNICATION PLATFORM

(71) Applicant: Twilio, Inc., San Francisco, CA (US)

(72) Inventor: Nicolas Acosta Amador, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,310

(22) Filed: Oct. 28, 2016

(65) Prior Publication Data

US 2017/0048306 A1    Feb. 16, 2017

Related U.S. Application Data

(63) Continuation of application No. 14/792,653, filed on Jul. 7, 2015, now Pat. No. 9,516,101.

(Continued)

(51) Int. Cl.
*G06F 15/16* (2006.01)
*H04L 29/08* (2006.01)
(Continued)

(52) U.S. Cl.
CPC .......... *H04L 67/10* (2013.01); *H04L 41/0816* (2013.01); *H04L 41/5074* (2013.01);
(Continued)

(58) Field of Classification Search
CPC ... H04L 67/10; H04L 41/0816; H04L 67/306; H04L 45/563; H04M 7/0021
See application file for complete search history.

(56) References Cited

U.S. PATENT DOCUMENTS 5,274,700 A    12/1993   Gechter et al.
5,526,416 A    6/1996    Dezonno et al.
(Continued)

FOREIGN PATENT DOCUMENTS

DE    1684587 A    3/1971
EP    0282126 A    9/1988
(Continued)

OTHER PUBLICATIONS

"Ethernet to Token ring Bridge"—Black Box Corporation, Oct. 1999 http://blackboxcanada.com/resource/files/productdetails/17044.pdf.

(Continued)

*Primary Examiner* — John M Macilwinen
(74) *Attorney, Agent, or Firm* — Schwegman Lundberg & Woessner, P.A.

(57) ABSTRACT

Systems and methods for updating a communication routing engine of a multi-tenant communication platform system. Responsive to a feedback message provided by an external system associated with a first account of the communication platform system, a communication routing engine of the communication platform system is updated based on the received feedback message. The feedback message relates to a first communication initiated on behalf of the first account of the communication platform system, and the first communication is initiated with a first communication route. The updated communication routing engine routes communications of a plurality of accounts of the communication platform system.

20 Claims, 12 Drawing Sheets

Related U.S. Application Data

(60) Provisional application No. 62/021,639, filed on Jul. 7, 2014.

(51) Int. Cl.
  *H04M 7/00* (2006.01)
  *H04L 12/24* (2006.01)
  *H04L 12/751* (2013.01)
  *H04L 12/721* (2013.01)

(52) U.S. Cl.
  CPC .............. *H04L 45/02* (2013.01); *H04L 45/12* (2013.01); *H04L 67/02* (2013.01); *H04L 67/30* (2013.01); *H04L 67/306* (2013.01); *H04M 7/0021* (2013.01)

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |

(56) References Cited

U.S. PATENT DOCUMENTS

| | | |
|---|---|---|
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,130,917 B2 | 3/2012 | Helbling et al. |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |

(56) References Cited

U.S. PATENT DOCUMENTS

| | | |
|---|---|---|
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,137,127 B2 | 9/2015 | Nowack |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,516,101 B2 | 12/2016 | Acosta Amador |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Martino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0073786 A1* | 4/2006 | Sarkar ............... H04L 65/80 455/24 |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |

(56) References Cited

U.S. PATENT DOCUMENTS

| | | |
|---|---|---|
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Swartz |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |

(56) References Cited

U.S. PATENT DOCUMENTS

| | | |
|---|---|---|
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Home et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1* | 12/2012 | Eng .................. H04L 45/00 379/90.01 |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1* | 10/2013 | Martins ................ H04L 67/10 709/226 |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0226799 A1* | 8/2014 | Aggarwal ............ H04M 3/2227 379/32.01 |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |

(56) References Cited

U.S. PATENT DOCUMENTS

| | | | |
|---|---|---|---|
| 2015/0082378 | A1 | 3/2015 | Collison |
| 2015/0100634 | A1 | 4/2015 | He et al. |
| 2015/0119050 | A1 | 4/2015 | Liao et al. |
| 2015/0181631 | A1 | 6/2015 | Lee et al. |
| 2015/0236905 | A1 | 8/2015 | Bellan et al. |
| 2015/0281294 | A1 | 10/2015 | Nur et al. |
| 2015/0365480 | A1 | 12/2015 | Soto et al. |
| 2015/0370788 | A1 | 12/2015 | Bareket et al. |
| 2016/0006794 | A1 | 1/2016 | Acosta Amador |
| 2016/0011758 | A1 | 1/2016 | Dornbush et al. |
| 2016/0077693 | A1 | 3/2016 | Meyer et al. |
| 2016/0112475 | A1 | 4/2016 | Lawson et al. |
| 2016/0112521 | A1 | 4/2016 | Lawson et al. |
| 2016/0119291 | A1 | 4/2016 | Zollinger et al. |
| 2016/0127254 | A1 | 5/2016 | Kumar et al. |
| 2016/0149956 | A1 | 5/2016 | Birnbaum et al. |
| 2016/0162172 | A1 | 6/2016 | Rathod |
| 2016/0205519 | A1 | 7/2016 | Patel et al. |
| 2016/0226937 | A1 | 8/2016 | Patel et al. |
| 2016/0226979 | A1 | 8/2016 | Lancaster et al. |
| 2016/0234391 | A1 | 8/2016 | Wolthuis et al. |
| 2016/0239770 | A1 | 8/2016 | Batabyal et al. |
| 2017/0339283 | A1 | 11/2017 | Chaudhary et al. |

FOREIGN PATENT DOCUMENTS

| | | | |
|---|---|---|---|
| EP | 1464418 | A | 10/2004 |
| EP | 1522922 | A2 | 4/2005 |
| EP | 1770586 | A1 | 4/2007 |
| EP | 2053869 | A1 | 4/2009 |
| ES | 2134107 | A | 9/1999 |
| JP | 10294788 | | 4/1998 |
| JP | 2004166000 | A | 6/2004 |
| JP | 2004220118 | A | 8/2004 |
| JP | 2006319914 | A | 11/2006 |
| WO | 9732448 | A | 9/1997 |
| WO | 2002087804 | | 11/2002 |
| WO | 2006037492 | A | 4/2006 |
| WO | 2009018489 | A | 2/2009 |
| WO | 2009124223 | A | 10/2009 |
| WO | 2010037064 | A | 4/2010 |
| WO | 2010040010 | A | 4/2010 |
| WO | 2010101935 | A | 9/2010 |
| WO | 2011091085 | A | 7/2011 |

OTHER PUBLICATIONS

Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23, 2012. pp. 1-6.

Archive Microsoft Office 365 Email | Retain Unified Archiving, 2015, GWAVA, Inc., Montreal, Canada. <http://www.gwava.com/Retain/Retain_for_Office_365.php>.

Complaint for Patent Infringement, *Telinit Technologies, LLC* v. *Twilio Inc.*, dated Oct. 12, 2012.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE. pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Twilio Cloud Communications—APIs for Voice, VoIP, and Text Messaging, Twilio. <http://www.twilio.com/docs/api/rest/call-feedback>.

Wu et al. "Quality Evaluation in Peer-to-Peer IPTV Services" Data Traffic and Monitoring Analysis, LNCS 7754. pp. 302-319. 2013.

"U.S. Appl. No. 14/792,653, Non Final Office Action dated Nov. 27, 2015", 12 pgs.

"U.S. Appl. No. 14/792,653, Response filed Feb. 19, 2016 to Non Final Office Action dated Nov. 27, 2015", 9 pgs.

"U.S. Appl. No. 14/792,653, Examiner Interview Summary dated Feb. 23, 2016", 4 pgs.

"U.S. Appl. No. 14/792,653, Final Office Action dated Apr. 15, 2016", 16 pgs.

"U.S. Appl. No. 14/792,653, Response filed Jul. 7, 2016 to Final Office Action dated Apr. 15, 2016", 13 pgs.

"U.S. Appl. No. 14/792,653, Examiner Interview Summary dated Jul. 7, 2016", 3 pgs.

"U.S. Appl. No. 14/792,653, Notice of Allowance dated Aug. 1, 2016", 9 pgs.

"U.S. Appl. No. 14/792,653, 312 Amendment filed Oct. 11, 2016", 10 pgs.

"U.S. Appl. No. 14/792,653, Notice of Allowance dated Oct. 20, 2016", 6 pgs.

\* cited by examiner

SYSTEM AND METHOD FOR COLLECTING FEEDBACK IN A MULTI-TENANT COMMUNICATION PLATFORM

CROSS-REFERENCE TO RELATED APPLICATIONS

This application is a continuation of U.S. patent application Ser. No. 14/792,653, filed 7 Jul. 2015, which claims the benefit of U.S. Provisional Application Ser. No. 62/021,639, filed on 7 Jul. 2014, both of which are incorporated in their entirety by this reference.

TECHNICAL FIELD

This invention relates generally to the communication feedback field, and more specifically to a new and useful system and method for collecting feedback in a multi-tenant communication platform in the communication feedback field.

BACKGROUND

Communication applications have provided ways for users to provide feedback on the quality of a call. However, such feedback is limited to impacting that particular application. In cases where applications are built on other communication infrastructure, the applications are prevented from providing feedback that alters the communication infrastructure. Thus, there is a need in the communication feedback field to create a new and useful system and method for collecting feedback in a multi-tenant communication platform. This invention provides such a new and useful system and method.

DESCRIPTION OF THE PREFERRED EMBODIMENTS

1. System for Collecting Feedback

Figure 1:
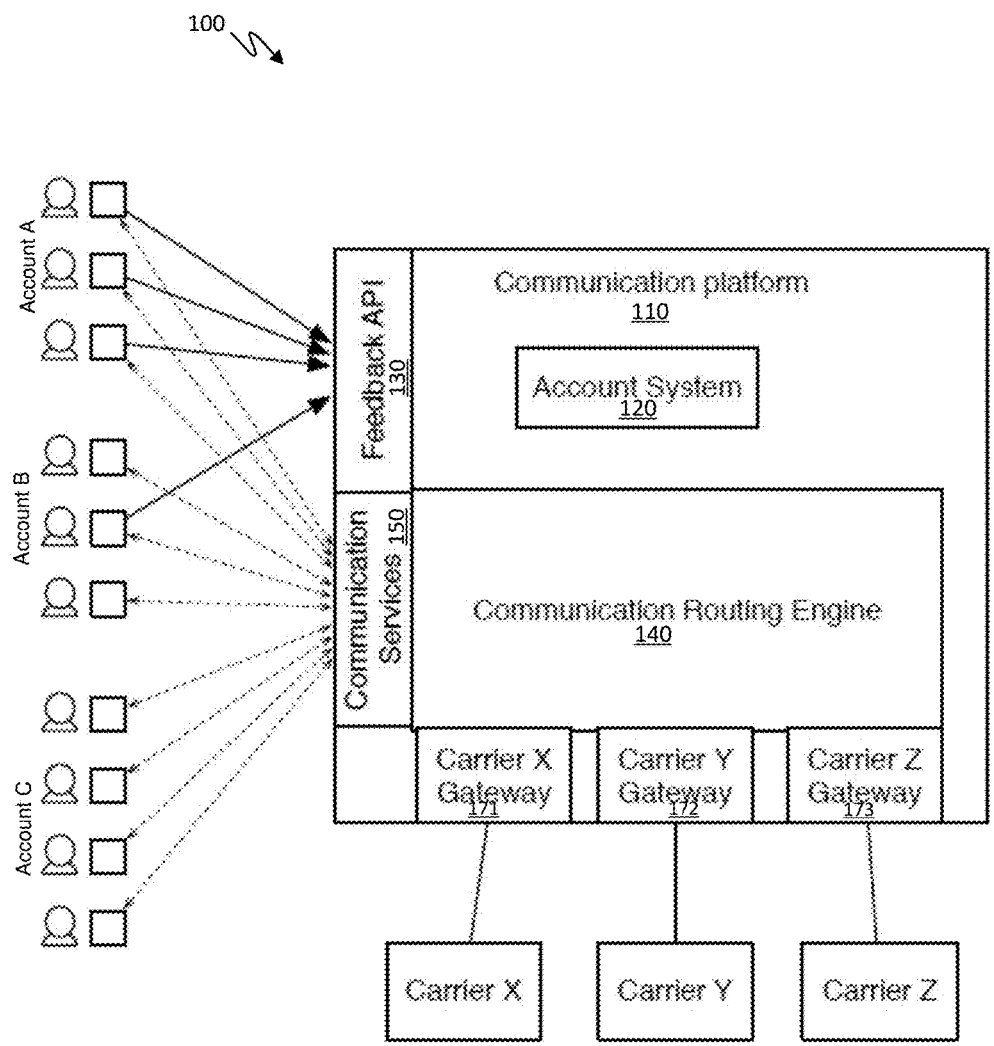
FIG. 1 is a schematic representation of a system of a preferred embodiment.

As shown in FIG. 1, a system 100 for collecting feedback in a multi-tenant communication platform 110 of a preferred embodiment can include a communication platform 110 with an account system 120, a feedback API 130, and a communication routing engine 140. The system is preferably used in the facilitation of communication with at least one endpoint. The system is preferably used in a system where feedback can be acquired from distinct and separate account entities (e.g., "Account A", "Account B", and "Account C" of FIG. 1) that both use the communication platform (e.g., 110) to serve a communication service (e.g., one of the communication services 150 of FIG. 1). The system can leverage the feedback of one or more accounts (e.g., "Account A", "Account B", and "Account C" of FIG. 1) to impact the communication routing. The system can preferably handle generalizing and normalizing feedback such that it can be applied to other accounts that share use of the communication platform 110 (e.g., feedback for "Account A" of FIG. 1 can be applied to communication routing of "Account B" and "Account C" of FIG. 1).

The communication platform 110 functions to provide any suitable communication service (e.g., one of the services 150 of FIG. 1). The communication platform 110 is preferably used for synchronous communication such as telephony voice communication over PSTN, SIP, WebRTC, IP-based protocol, and/or any suitable voice communication channel. The communication can additionally or alternatively facilitate video communication and/or other forms of synchronous media or data communication. The communication can additionally or alternatively be used in providing asynchronous communication such as messaging (SMS, MMS, IP-based messaging). The communication platform 110 can be used in routing between one or more endpoints. The communication platform 110 may additionally provide communication functionality such as recording, dynamic routing, application execution, TTS services, transcription, speech recognition, conferencing, call waiting, and/or any suitable communication service. In some embodiments, the communication platform is a telephony communication platform. In some embodiments, the communication platform is similar to the communication platform described in U.S. Pat. No. 8,306,021, issued on 6 Nov. 2012, which is incorporated in its entirety by this reference.

The communication platform 110 preferably includes an account system (e.g., 120), which functions to allow distinct accounts (e.g., "Account A", "Account B", and "Account C" of FIG. 1) to use the communication platform 110. An account (e.g., "Account A", "Account B", and "Account C" of FIG. 1) is preferably operated by a developer or application provider that builds an application or service that utilizes the communication platform 110. For example, an account (e.g., "Account A", "Account B", and "Account C" of FIG. 1) may build a call center application that uses the communication platform 110 to direct customers to customer service representatives. Alternatively, the account may be end users of an endpoint (e.g., phone number or SIP address) that use the communication platform 110 to provide some service. For example, an end user may use the communication platform 110 to dynamically direct incoming calls to ring multiple destinations until the first device picks up. Any suitable account hierarchy or division may be used. For example, an account may include subaccounts, which run different instances of an application with unique configuration. The accounts additionally have specific authentication credentials. API requests and communication is preferably scoped to a particular account. Accordingly, feedback provided by one account can be stored and associated with the account.

The feedback API 130 is preferably a set of feedback API calls and/or resources that can be used in the setting, editing, and reading of feedback information. Feedback can preferably be provided for a single communication session, a portion of a communication session, a communication endpoint, a feature of a communication session (e.g., conferencing performed well or poorly), or for any suitable portion of the communication. Feedback can additionally be reviewed through feedback logs. An account is preferably limited with privileges to interacting with feedback of communication associated with their account.

The feedback API 130 is preferably part of a RESTful API but may alternatively be any suitable API such as SOAP or custom protocol. The RESTful API works according to an HTTP request and response model. HTTP requests (or any suitable request communication) to the communication platform 110 preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as API endpoints, which act as a mechanism for specifying requested information or requesting particular actions. The resources can be expressed as URI's or resource paths. The RESTful API resources can additionally be responsive to different types of HTTP methods such as GET, PUT, POST and/or DELETE. Preferably, a call session will have a REST resource which can have feedback subresource where a POST can add feedback for that communication session and a GET to access any feedback information.

The communication routing engine 140 functions to manage the determination and establishment of communication routes. The communication platform 110 will preferably include a variety of routing options. The routing options can include different internal routing options (routing a communication within the platform) and external routing options. The external routing options may be determined based on which carriers or provider gateways are used in reaching an external endpoint. Additionally or alternatively, some directives may be supplied to external communication providers in how a communication should be routed. The communication routing engine 140 preferably includes a communication routing network graph. The communication routing network graph preferably characterizes and maps the routing options. The communication routing network graph can additionally be associated with various routing scores. The routing scores can relate to quality, cost, priority, and other suitable parameters that may be used in selecting a communication route for a communication session.

2. Method for Collecting Feedback

Figure 2:
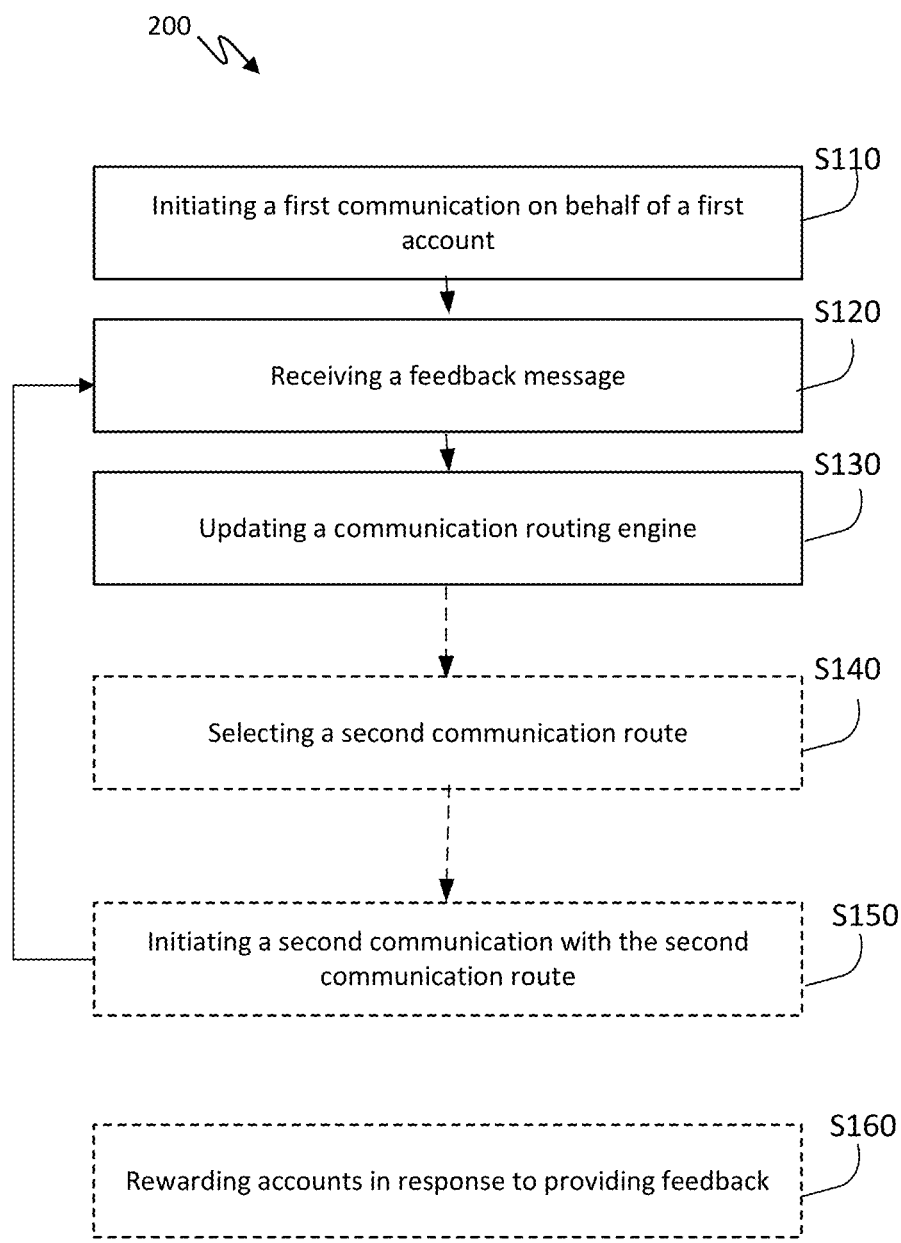
FIG. 2 is a flowchart representation of a method of a preferred embodiment.

As shown in FIG. 2, a method 200 for collecting feedback in a multi-tenant communication platform (e.g., 110) of a preferred embodiment can include initiating a first communication on behalf of a first account (e.g., "Account A", "Account B", and "Account C" of FIG. 1) S110, receiving a feedback message S120, and updating a communication routing engine (e.g., 140) S130. The method 200 can additionally include selecting a second communication route S140 and initiating a second communication with the second communication route S150. The method 200 functions to leverage feedback received from a segment of applications (e.g., applications of one or more of "Account A", "Account B", and "Account C" of FIG. 1) in a communication platform (e.g., 110) to impact the overall communication routing (e.g., the routing provided by the communication routing engine 140 for "Account A", "Account B", and "Account C" of FIG. 1). As the account holders may have less incentive to provide feedback, rewards can be integrated into the feedback process (S160). Additionally, the quality of feedback may vary between accounts, and the method 200 preferably accounts for such differences when assessing the feedback. The method 200 is preferably used in a communication platform such as the one described above (e.g., 110), but may alternatively be used with any suitable type of communication platform.

Block S110, which includes initiating a first communication on behalf of a first account, functions to establish a communication session through the communication platform 110. The first communication is preferably a synchronous communication—a communication between at least two endpoints. The communication can alternatively be a group/conferencing communication or a communication with one external endpoint to an internal automated endpoint (e.g., a media player or text-to-speech service). The communication can be a voice, video, chat, multimedia, or any suitable data communication. The communication may alternatively be an asynchronous communication message. In one variation, the communication is a voice communication made over the PSTN or a SIP communication channel. The communication may alternatively use WebRTC or any suitable protocol. The communication may additionally include legs with different protocols. Initiating a first communication preferably includes receiving a communication request and establishing the communication. The communication request may be an inbound communication, which may be routed to some internal or external communication endpoint. The communication request may alternatively be a received API request, a triggered event from an application, a triggered event from an existing communication, or any suitable type of event to trigger communication.

Initiating a first communication can additionally include notifying a requesting entity of feedback alert. This variation preferably includes determining the value or worth of feedback for the first communication. In the communication platform 110, various metrics and data may be collected and processed. Some forms of communication may experience different forms of usage, which may result in asymmetrical data on the quality of different communication routing decisions. For example, calls made to heavily populated areas may be well understood, but calls to a new or less popular area may utilize less utilized communication routes/carriers which have little or out-of-date information. Acquiring feedback on communication routes that include segments with little data may benefit from prompting for feedback. As the triggering of feedback is preferably delegated to the account holder systems, the communication platform may not have a mechanism to force feedback. A mechanism for inserting feedback control may alternatively be available. An auto feedback collection feature may be enabled for the communication platform or alternatively for specific accounts. In absence or in addition to auto controlled feedback collection, feedback alerts may suggest when feedback is recommended.

In one variation, the feedback alert may be explicitly represented in a parameter of a response to a requesting entity. For example, a feedback-status parameter may include possible parameters such as "recommended", "optional", or "not essential". In another variation, the feedback alert may be implicitly represented in other related parameters. For example, a predicted quality parameter may indicate the predicted quality. The requesting entity can use "good quality" prediction as a signal that no feedback is needed. The requesting entity can use a "poor quality" or "unknown quality" prediction as a signal that feedback is recommended for the first communication.

As indicated below, rewards or communication results may be gained by an account providing feedback. The feedback alert may alternatively provide a metric or information relating to such an award. For example, a feedback alert metric may be specified with a rating of zero to five, where each value corresponds to some form of result. A metric value of zero may correspond to no reward, where five may indicate the communication can be free if feedback is provided.

A first communication is preferably made with a set communication routing setting. As described more below, the selection may be made to select the best communication route. However, communication route selection may be made to inspect particular routes, route settings, route segments, or any aspect of a route. For example, for a given communication from endpoint A to endpoint B a well-known and high quality route may be known by the communication routing engine 140. However, a second routing option may have been recently introduced which is another option. That routing option may need evaluation and accordingly, the communication routing engine 140 may bias the selection of a communication route to select routing options that promote the collection and updating of route data. The route used is preferably stored so that it may be correlated to the feedback.

Figure 5:
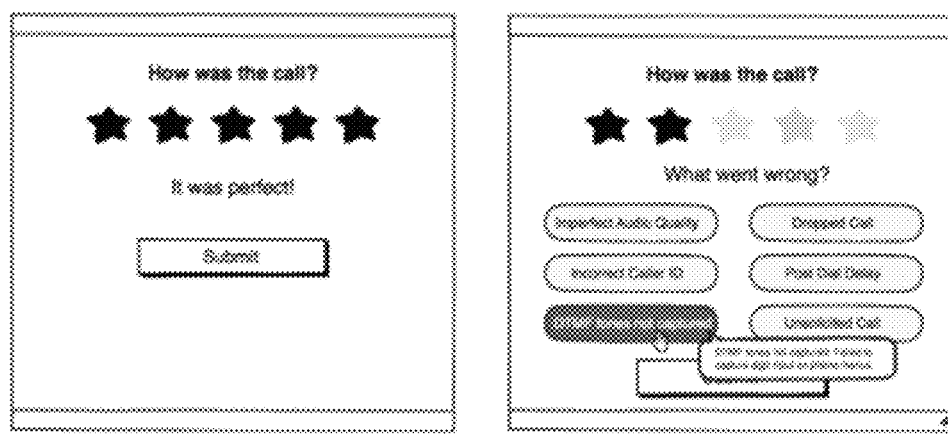
FIG. 5 is a representation of an exemplary interface that may be generated by a system of an account holder.

Block S120, which includes receiving a feedback message, functions to obtain a message from an account holder (e.g., an account holder of one or more of "Account A", "Account B", and "Account C" of FIG. 1) that communicates feedback evaluation of a communication. A feedback response is preferably a message made through an API (e.g., the feedback API 130 of FIG. 1). As described above, the API is preferably a REST API. The feedback message is preferably received from at least a first account, but feedback is preferably received from a plurality of accounts (e.g., "Account A", "Account B", and "Account C" of FIG. 1) on the multi-tenant communication platform 110. The feedback API 130 interface is preferably provided such that account holders (e.g., the system of an application developer or service provider) can capture feedback from end users (one or more participants in a communication session) in any suitable manner. The interface or manner in which an end user provides the information can be customized for each account and/or situation. For example, some account holders may build a user interface (such as the interface shown in FIG. 5) that is provided in a website or application where users can provide feedback. In another example, the feedback from the end users can be captured through DTMF input or voice input provided during or at the end of a communication. The communication platform 110 may not enforce any restrictions on the representation or even mechanism of obtaining input from an end-user. Alternatively, the response a feedback interface or interaction flow may be provided or directed by the communication platform 110 through the account holder.

Figure 3:
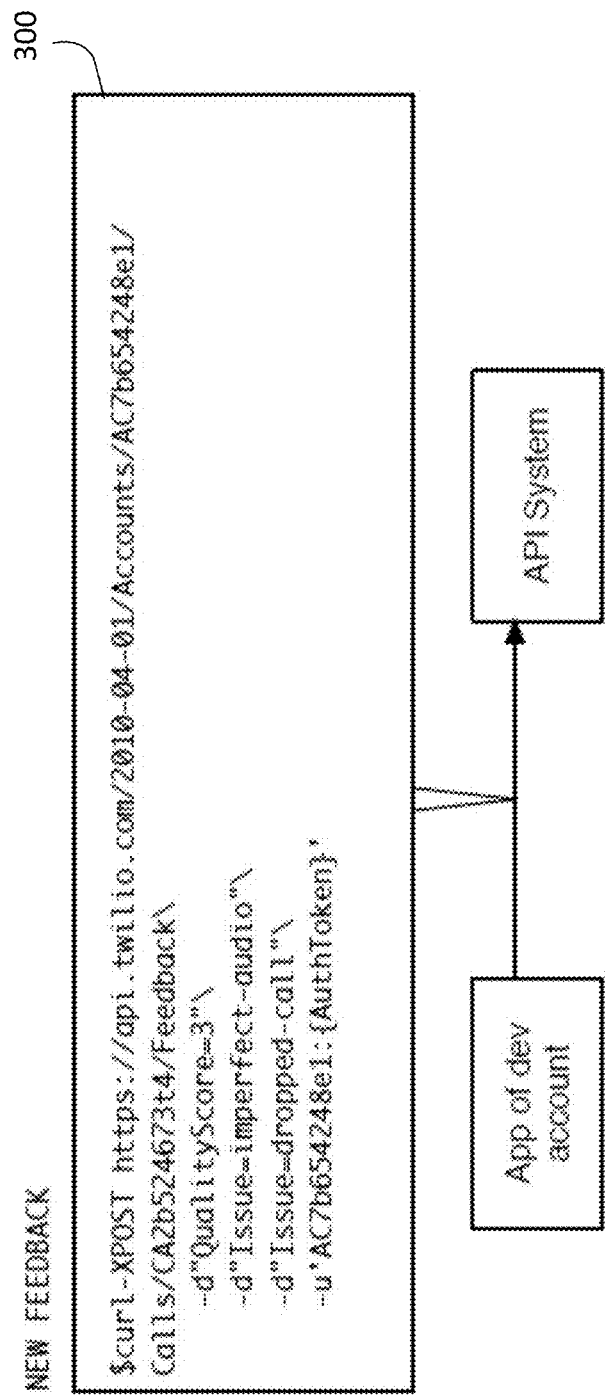
FIG. 3 is a schematic representation of an exemplary feedback API call.

FIG. 3, shows an exemplary feedback API message 300. The feedback message 300 preferably identifies an associated communication session, a quality metric, and optionally various quality categorizations. The feedback message may additionally identify the endpoint associated with the feedback. For example a caller and a callee of a communication session may both provide feedback. Similarly, a conference call may obtain feedback from multiple participants. The quality metric may be a simple overall rating of the communication. The quality categorizations may identify different issues or positive aspects of a call. The quality categorizations may be a set of labels that identify issues present in the call such as imperfect audio, imperfect video, dropped call, incorrect caller ID, post dial delay, digits not captured, voice recognition issues, unsolicited call, audio/video latency, one way audio/video, and other suitable categorizations. Imperfect audio or video can refer to poor media quality, choppy media, echoes, garbled audio or video, and the like. The feedback message may additionally include account specific parameters to mark a call. For example, an account specific parameter may be used to record how satisfied a customer was with the customer care representative.

The feedback message (e.g., 300) is preferably processed and stored. The feedback information of a communication session may additionally be persisted and made accessible through the API (e.g., 130)—an account holder may access feedback records at any suitable time. The feedback may additionally or alternatively be integrated into a control panel or communication analytics dashboard. The feedback information may additionally be supplemented according to the conditions of how the feedback was received. For example, the state of the communication session can be recorded for when a particular feedback message is obtained (e.g., during the call, end of call, or after the call). Additionally, obtained quality metrics can be integrated into the feedback information. The communication route may change during a communication session; the set of communication route topologies that were present during a session leading up to the feedback may all be tracked.

Block S130, which includes updating a communication routing engine 140, functions to alter routing metrics and selection processes for future communications. As described above, the communication platform 110 preferably includes a variety of communication routing options. Various carriers, different internal media communication paths, different protocols or communication channel types may provide options when establishing a communication session. The communication routing engine 140 may include a communication routing network graph, where the network segments and/or nodes can have various scores, weights, and/or other suitable values assigned to them. The scores of the communication routing network graph preferably relate, at least partially, to the quality assessment provided by the feedback API 130. The method 200 may apply various approaches to integrating feedback information into the communication routing engine 140.

The feedback preferably impacts the route used for the first communication, which can include internal routing, and selection of gateways (e.g., the gateways 171-173 of FIG. 1) to carrier/communication providers. The feedback may impact a subset of this routing information. For example, the feedback may be used to evaluate just carrier selection. The feedback may additionally be used to evaluate partial segments. As will be discussed below, the feedback may be part of a segment/routing evaluation process to systematically determine quality of particular routing segments. In one variation, the communication within the communication platform 110 is executed through a signaling and media protocol such as SIP. The feedback is preferably applied to media routing but may additionally or alternatively be applied to signaling routing aspects. As another aspect, the involved endpoints may be factored into the processing of the feedback. Feedback may relate to the pairing of involved endpoints, the regional association of involved endpoints, set of carriers involved in the communication, or any suitable pattern in the communication session. Additionally or alternatively, feedback may be isolated to applying to one aspect of the communication. For example, if communications from carrier A to B consistently experiences high feedback but communication from carrier A to C receives low quality feedback, then the method can assign the low quality feedback to the carrier C routing gateways.

As another variation, the feedback may additionally be applied to processing or services applied to a communication. For example, the settings for a media processing operation may be altered according to the feedback. As another example, transcoding process may be altered according to the feedback.

As another variation, the feedback may be conditionally applied to the communication routing engine 140. Temporal properties may impact the evaluation of the feedback and how the feedback should be processed. In a first instance, the feedback may be integrated into the time-based evaluation of communication routing. Different communication routing options may be dependent on different temporal patterns. For example, a carrier may have heavy call volume during particular time windows. The temporal patterns in feedback can preferably be detected and applied to the quality metrics such that route selection can be a function of time for particular resources. In the example above, the carrier is preferably avoided during the time windows of heavy traffic. In a second instance, the feedback may not be permanent. Feedback evaluations can expire, allowing old or out of date feedback to not permanently bias evaluation of a route.

The feedback may additionally be weighted or otherwise processed according to the associated account. Properties such as account communication volume, account feedback history, account age, account usage location, and other properties of an account can be used in determining how feedback should be evaluated. Similarly, endpoint association of the feedback can similarly be used. External endpoints that provide feedback may be weighted less than feedback associated with internally managed endpoints. For example, a customer service application may have a set of endpoints managed through the communication platform. Feedback provided from callers on these endpoints will likely be customer care representatives of the customer service application, and feedback from these users may be more professionally and consistent than feedback from the end users calling into the customer service application. As another aspect of processing feedback according to account, feedback with unique account associations may be weighted differently from repeated feedback for a particular route from a single account. Receiving input from a variety of accounts can promote receiving feedback from a variety of use-cases. As a potential benefit, the diverse feedback can ensure no one account biases the communication routing engine.

The method 200 preferably additionally includes selecting a second communication route S140 and initiating a second communication S150, which functions to utilize the updated communication routing engine 140 in subsequent communications. As discussed, the method 200 is preferably applied to integrating feedback into a multi-tenant communication platform (e.g., 110). Accordingly, the second communication can be made on behalf of a second account. The second account can be any suitable account of the communication platform 119. The second account may have also contributed feedback or may never have contributed feedback. The feedback provided by the second account may or may not relate to the current route options for the second communication. The updated communication routing engine 140 can similarly be used for accounts that have contributed feedback (e.g., the first account). Selecting of a communication route can include determining a route. The selection may be based on processing of a plurality of quality metrics and optionally using any suitable network graph search process to find a best route based on one or more quality heuristic/function.

Figure 4:
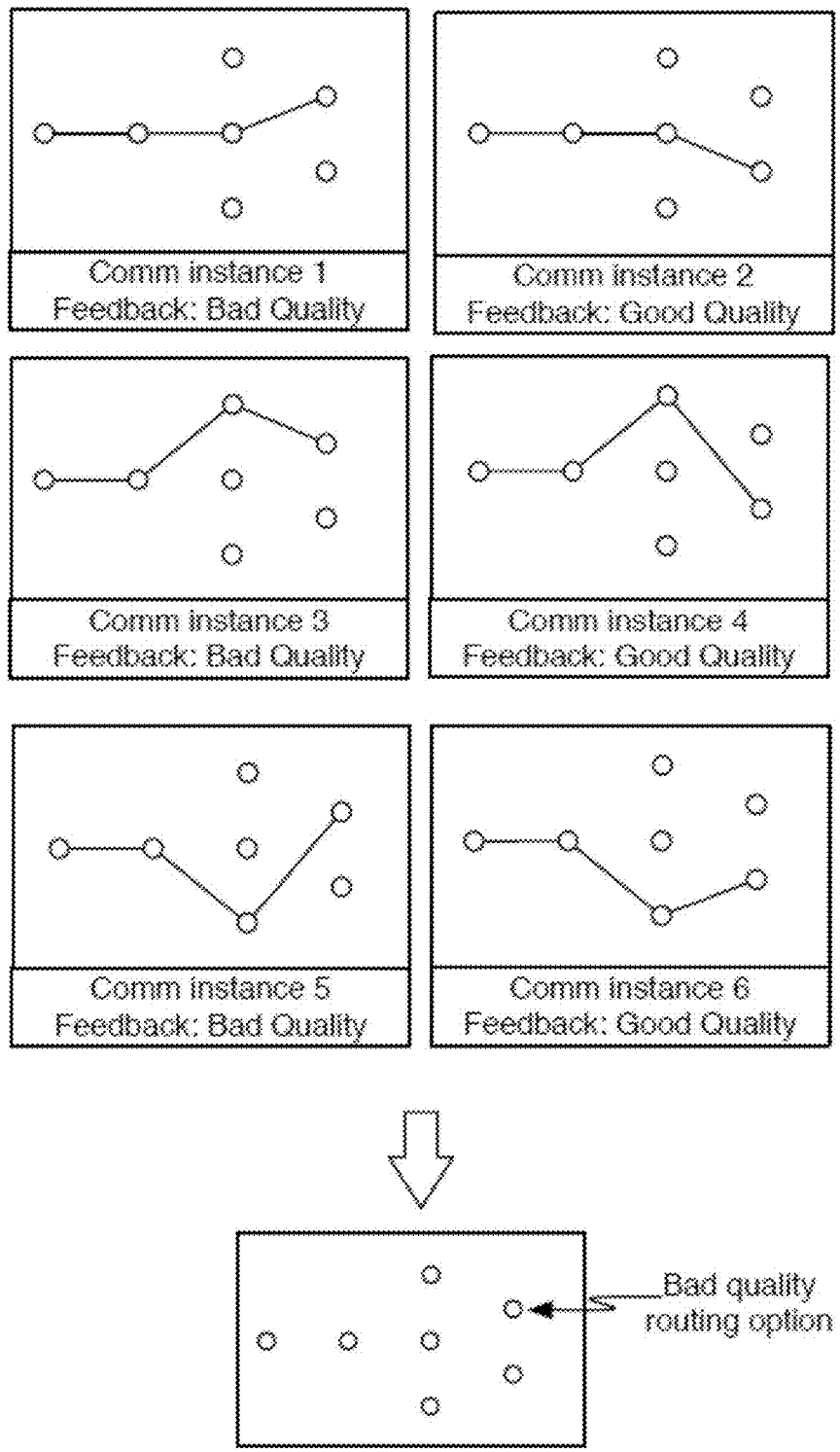
FIG. 4 is a schematic representation of updating the communication routing engine based on multiple communication sessions.

Alternatively, selection of a second communication route may deliberately be selected to screen different routes and/or route segments. A set of different routing options can be used in combination to isolate feedback to a subsection of the routes. As shown in FIG. 4, feedback may be received for a first route, but the poor quality may not be uniquely assigned to any one segment. Subsequent communication sessions can be selected to isolate feedback responsibility. In the example shown in FIG. 4, a node may eventually be associated with the poor quality feedback. This variation preferably involves multiple iterations of the feedback method. Such segment feedback determination preferably involves identifying communication sessions that correspond to matching route options. The communication routing engine can be updated to reflect the intermediary or end result of the segment feedback determination. Such a process may additionally be dependent on which accounts regularly provide feedback. If an opportunity to collect information that can be used in isolating feedback results, feedback alert may be supplied in response to a communication request such that the account holder may be notified that feedback is requested. In some cases, a communication session may update routing information during a communication session. For example, a call may end a connection with one endpoint and connect to a second endpoint, or a communication session may be a conferencing communication session and various endpoints come and go. Selection of a second communication route and initiating a second communication can similarly be applied to modification or transitioning of an existing communication session.

The method 200 may additionally include rewarding accounts in response to providing feedback (e.g., S160 of FIG. 2). The reward may include crediting an account. Crediting an account may allocate usage allotments or discounts to the account. For example, an account that supplies sufficient amounts of feedback may be rewarded with fees for a number of communications to be waived. The reward may additionally or alternatively include prioritizing communication of the account. Prioritizing communication can include providing higher quality routes, giving the account priority when queuing communication requests. Other suitable rewards may alternatively be provided.

3. Multi-Tenant Communication Platform System

Figure 6:
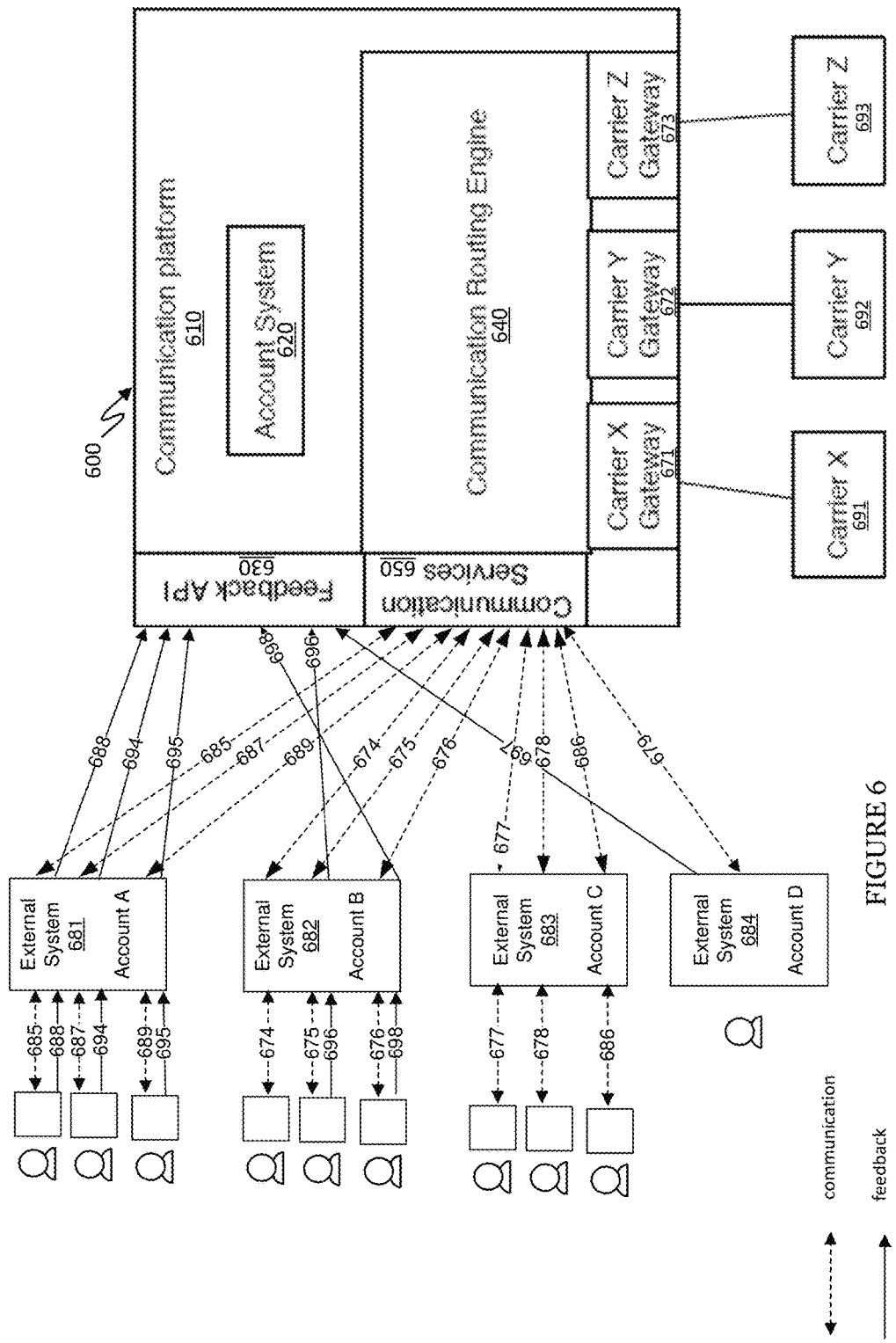
FIG. 6 is a schematic representation of a system of a preferred embodiment.

As shown in FIG. 6, a multi-tenant communication platform system 600 for collecting feedback in a multi-tenant communication platform includes the communication platform 610, a feedback API 630, a communication routing engine 640, carrier services 650, and carrier gateways 671-673. The communication platform 610 includes an accounting system 620.

In the example embodiment of FIG. 6, the communication platform 610 is similar to the communication platform 110 of FIG. 1, the feedback API 630 is similar to the feedback API 130 of FIG. 1, the communication routing engine 640 is similar to the communication routing engine 140 of FIG. 1, the carrier services 650 are similar to the carrier services 150 of FIG. 1, the carrier gateways 671-673 are similar to the carrier gateways 171-173 of FIG. 1, and the accounting system 620 is similar to the accounting system 120 of FIG. 1.

The system 600 is communicatively coupled to each of the external systems 681-684 via the feedback API 630 and an API of the communication services 650. The system 600 is communicatively coupled to each of the carriers 691-693 via a respective one of the carrier gateways 671-673.

In the embodiment of FIG. 6, each external system 681-684 is a system of an account holder of an account (e.g., "Account A", "Account B", "Account C", "Account D") of the communication platform 610. In some implementations, each account of the communication platform 610 (e.g., "Account A", "Account B", "Account C", "Account D") is an account that is managed by the account system 620. In some implementations, external systems include a system of an application developer that provides an application to users of the external system. In some implementations, external systems include a system of a service provider that provides a service to users of the external system. In some implementations, external systems include a communication endpoint (e.g., the external system 684).

In some implementations, the communication platform 610, the feedback API 630, the communication routing engine 640, the carrier services 650, the carrier gateways 671-673, and the accounting system 620 are implemented as a server device. In some implementations, the communication platform 610, the feedback API 630, the communication routing engine 640, the carrier services 650, the carrier gateways 671-673, and the accounting system 620 are implemented as a plurality of server devices communicatively coupled to each other (e.g., a computing cluster).

4. Method of FIG. 7

Figure 7:
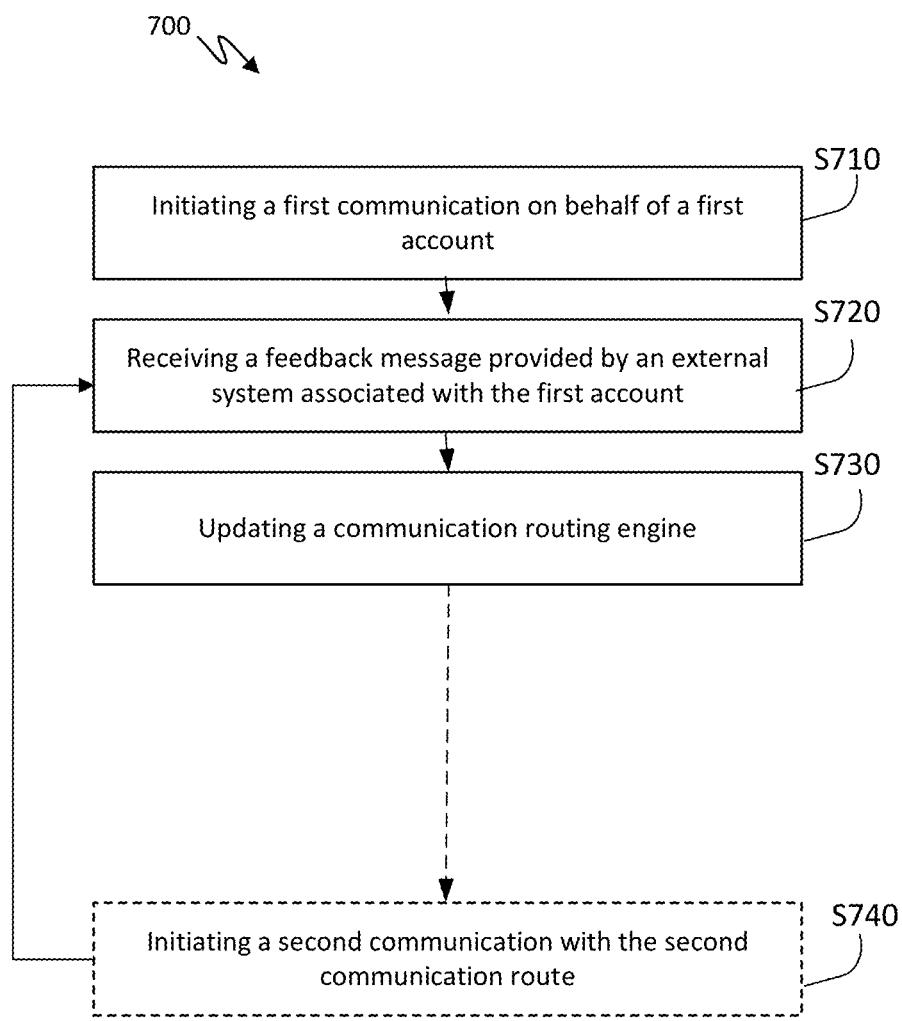
FIG. 7 is a flowchart representation of a method of a preferred embodiment.

As shown in FIG. 7, a method 700 for updating a communication routing engine (e.g., 640 of FIG. 6) of a multi-tenant communication platform system (e.g., 600) includes, at the multi-tenant communication platform system: initiating a first communication (e.g., 685) on behalf of a first account of the communication platform, the first communication being initiated with a first communication route (process S710); receiving a feedback message (e.g., 688) provided by an external system (e.g., 681-684) associated with the first account, the feedback message relating to the first communication of the first account (process S720); and updating a communication routing engine (e.g., 640) of the communication platform based on the received feedback message of the first account (process S730). The updated communication routing engine (e.g., 640) routes communications (e.g., 685, 687, 689, 674, 675, 676, 677, 678, 679 686) of a plurality of accounts of the communication platform. In some implementations, the method 700 includes controlling the multi-tenant communication platform system 600 to initiate a second communication (e.g., the communication 686 of FIG. 6) with a second communication route (process S740).

In some implementations, the multi-tenant communication platform system 600 performs the processes S710, S720, S730 and S740, and controls the updated communication routing engine to route communications of a plurality of accounts of the communication platform.

In some implementations, the communication platform 610 performs the process S710. In some implementations, the communication services 650 performs the process S710. In some implementations, the communication platform 610 and the communication services 650 perform the process S710. In some implementations, the communication platform 610 performs the process S710 responsive to a request received via the communication services 650. In some implementations, the communication routing engine 640 selects the first communication route. In some implementations, the communication platform 610 selects the first communication route. In some implementations, the communication platform 610 and the communication routing engine 640 select the first communication route. In some implementations, the communication routing engine 640 determines one or more communication routes, and the communication platform 610 selects a determined communication route as the first communication route.

In some implementations, the communication platform 610 performs the process S720. In some implementations, the feedback API 630 performs the process S720. In some implementations, the communication platform 610 and the feedback API 630 perform the process S720. In some implementations, the communication platform 610 performs the process S720 responsive to a request received via the feedback API 630. In some implementations, the communication platform 610 performs the process S720 responsive to a response received via the feedback API 630.

In some implementations, the communication platform 610 performs the process S730. In some implementations, the communication routing engine 640 performs the process S730. In some implementations, the communication platform 610 and the communication routing engine 640 perform the process S730. In some implementations, the communication platform 610 controls the communication routing engine 640 to perform the process S730. In some implementations, the communication routing engine 640 performs the process S730 responsive to control provided by the communication platform 610.

In some implementations, the communication routing engine 640 routes communications of a plurality of accounts of the communication platform. In some implementations, the communication platform 610 and the communication routing engine 640 route communications of a plurality of accounts of the communication platform. In some implementations, the communication platform 610 controls the communication routing engine 640 to route communications of a plurality of accounts of the communication platform. In some implementations, the communication routing engine 640 routes communications of a plurality of accounts of the communication platform responsive to control provided by the communication platform 610.

In some implementations, the communication platform 610 performs the process S740. In some implementations, the communication services 650 performs the process S740. In some implementations, the communication platform 610 and the communication services 650 perform the process S740. In some implementations, the communication platform 610 performs the process S740 responsive to a request received via the communication services 650. In some implementations, the communication platform 610 and the communication routing engine 640 perform the process S740. In some implementations, the communication platform 610 performs the process S740 responsive to a request received via the communication services 650.

In some implementations, the communication routing engine 640 selects the second communication route. In some implementations, the communication platform 610 selects the second communication route. In some implementations, the communication platform 610 and the communication routing engine 640 select the second communication route.

In some implementations, the communication routing engine 640 determines one or more communication routes, and the communication platform 610 selects a determined communication route as the second communication route.

In some implementations, the feedback API 630 stores feedback information of the feedback message. In some implementations, the communication platform 610 stores feedback information of the feedback message. In some implementations, the communication routing engine 640 stores feedback information of the feedback message.

In some implementations, the process S710 is similar to the process S110 of FIG. 2. In some implementations, the process S720 is similar to the process S120 of FIG. 2. In some implementations, the process S730 is similar to the process S130 of FIG. 2. In some implementations, the process S740 is similar to the processes S140 and S150 of FIG. 2.

4.1 Initiating the First Communication

In some implementations, the process S710 functions to control the multi-tenant communication platform system 600 to initiate the first communication (e.g., the communication 685 of FIG. 6) on behalf of the first account (e.g., "Account A" of FIG. 6) of the communication platform 610, and the communication platform system 600 initiates the first communication (e.g., 685) with a first communication route.

In some implementations, the communication platform system 600 receives a request to initiate the first communication via an API of the communication services 650, and the communication platform system 600 initiates the first communication responsive to the request to initiate the first communication. In some implementations, the communication platform system 600 receives an inbound communication (e.g., via the communication services 650, via a call router of the system 600, and the like), and the communication platform system 600 initiates the first communication responsive to the inbound communication. In some implementations, an application of the communication platform 610 triggers an event, and the communication platform system 600 initiates the first communication responsive to detection of the triggered event. In some implementations, an existing communication of the communication platform 610 triggers an event, and the communication platform system 600 initiates the first communication responsive to detection of the triggered event.

In some implementations, the communication platform system 600 uses the communication routing engine 640 to initiate the first communication. In some implementations, the communication routing engine 640 routes the first communication to some internal or external communication endpoint. In some implementations, the first communication is made with a set communication routing setting, as described above for S110 of FIG. 2. In some implementations, the system 600 selects a communication route based on stored feedback information (e.g., the feedback information 1115 of FIG. 11, the feedback information of FIGS. 8A-B).

In some implementations, the system 600 selects the first communication route by determining at least one candidate route, and selecting a determined candidate route. In some implementations, the system 600 selects the first communication route based on processing of a plurality of quality metrics. In some implementations, the system 600 selects the first communication route based on processing of a plurality of quality metrics and performing a network graph search process to determine a best route by applying at least one quality heuristic/function to the quality metrics. In some implementations, the system 600 selects the first communication route based on processing of quality metrics of a feedback information (e.g., the feedback information of FIGS. 8A-B) of a plurality of feedback messages. In some implementations, the system 600 selects the first communication route based on processing of quality metrics of a feedback information (e.g., the feedback information of FIGS. 8A-B) of a plurality of feedback messages and performing a network graph search process to determine a best route by applying at least one quality heuristic/function to the quality metrics. In some implementations, the system 600 selects the first communication route by screening different routes and/or route segments based on feedback information (e.g., the feedback information of FIGS. 8A-B) of received feedback messages, as described above for FIG. 4 and S140 of FIG. 1. In some implementations, the system 600 biases selection of the first communication route to select routing options that promote the collection and updating of route data.

Figure 8A:
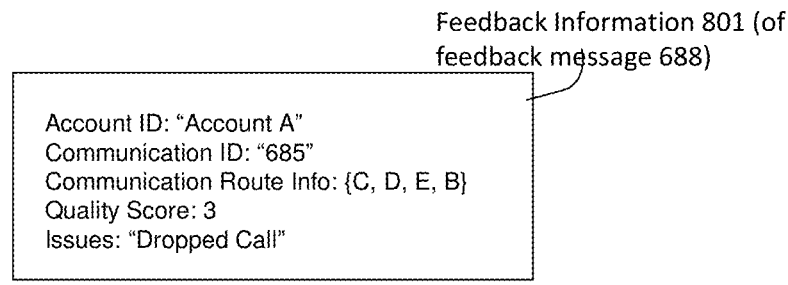
FIGS. 8A and 8B are illustrations of exemplary feedback information of a preferred embodiment.
Figure 8B:
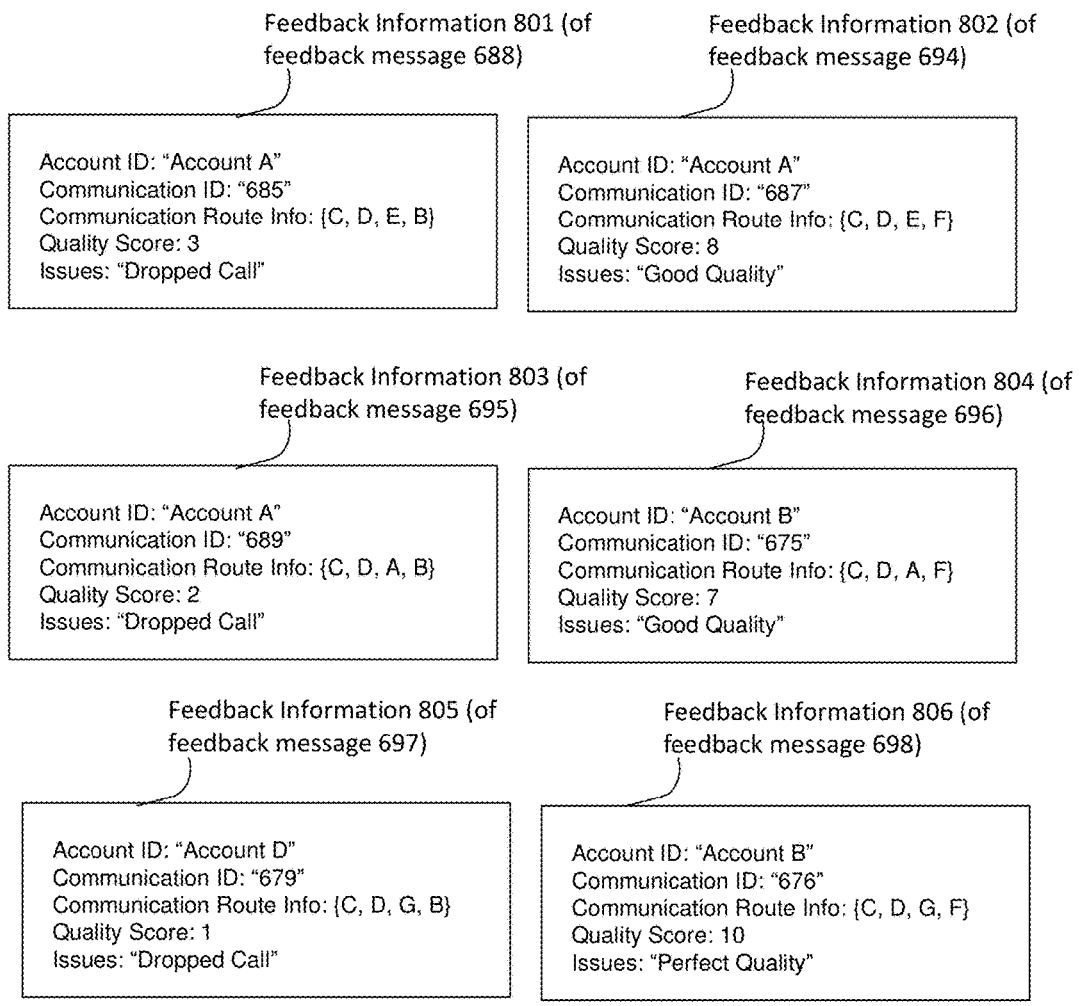

In some implementations, the system 600 stores information of the first communication route (e.g., information identifying a sequence of communication nodes of the communication route), and the system 600 correlates received feedback information with the stored information of the first communication route (e.g., as shown in FIGS. 8A-B). For example, as shown in FIG. 8A, feedback information ("Quality Score: 3"; "Issues: 'Dropped Call'") of the received feedback message 688 of the first communication 685 is stored in association with communication route information ("{C, D, E, B}") for the first communication route.

In some implementations, initiating the first communication includes controlling the communication platform system 600 to notify a requesting entity (e.g., one of the external systems 681-684 of FIG. 6) of at least one feedback alert, as described above for S110 of FIG. 2.

4.2 Receiving a Feedback Message

In some implementations, the process S720 functions to control the multi-tenant communication platform system 600 to receive a feedback message (e.g., the feedback message 688 of FIG. 6) provided by an external system (e.g., the external system 681) associated with the first account (e.g., "Account A"). The feedback message relates to the first communication (e.g., the communication 685 of FIG. 6) of the first account (e.g., "Account A"). In some implementations, the communication platform system 600 receives the feedback message as described above for S120 of FIG. 2. In some implementations, the communication platform system 600 receives the feedback message (e.g., 688) via the feedback API 630.

4.3 Updating the Communication Routing Engine

In some implementations, the process S730 functions to control the multi-tenant communication platform system 600 to update the communication routing engine 640 of FIG. 6 based on the received feedback message (e.g., the feedback message 688) of the first account (e.g., "Account A"). The communication platform system 600 routes communications of a plurality of accounts (e.g., accounts of the account system 120) of the communication platform 610 by using the updated communication routing engine 640. In this manner, the communication platform system 600 updates routing for multiple accounts (e.g., Accounts A, B, C and D) based on feedback provided by a first account (e.g., Account A). Thus, external systems (e.g., 681-684) can provide feedback to the communication platform system 600 that alters the communication infrastructure. For example, feedback provided by users of a first application of a first account of the communication platform 610 can alter communication routing for a second application of a second account of the communication platform 610.

In some implementations, the system 600 updates the communication routing engine 640 by updating internal routing within the system 600. In some implementations, the system 600 updates the communication routing engine 640 by updating selection of at least one gateway (e.g., gateways 671-673 of FIG. 6). In some implementations, the system 600 updates the communication routing engine 640 by altering routing metrics and selection processes used by the communication routing engine 640 for routing of communications of a plurality of accounts (e.g., accounts of the account system 620) of the communication platform system 600. In some implementations, the system 600 performs internal routing and selection of gateways to external carriers or communication providers based on the received feedback message. In some implementations, the system 600 processes communication based on the received feedback message. In some implementations, the system 600 applies services to communication based on the received feedback message. In some implementations, the system 600 alters settings for media processing based on the received feedback message. In some implementations, the system 600 alters transcoding of communication based on the received feedback message. In some implementations, the system 600 conditionally applies feedback information of the feedback message to the communication routing engine 640, as described above for S130 of FIG. 1. In some implementations, the system 600 weighs feedback information of the feedback message according to the associated account, as described above for S130 of FIG. 1.

In some implementations, the system 600 updates the communication routing engine 640 by providing the communication rouging engine 640 with feedback information of the received feedback message (e.g., the feedback information of FIG. 8A). In some implementations, the system 600 updates the communication routing engine 640 by providing the communication rouging engine 640 with a notification that the system 600 has received new feedback information which corresponds to the received feedback message, and by providing the communication routing engine 640 with information to access the new feedback information (e.g., from the storage medium 1105 of FIG. 11).

In some implementations, the communication platform system 600 updates the communication routing engine 640 as described above for S130 of FIG. 2.

4.4 Initiating a Second Communication

In some implementations, the method 700 includes controlling the multi-tenant communication platform system 600 to initiate a second communication (e.g., the communication 686 of FIG. 6) with a second communication route (process S740). The multi-tenant communication platform system 600 selects the second communication route based on the updating of the communication routing engine (e.g., the updating at the process S730). In some implementations, the process S740 functions to control the multi-tenant communication platform system 600 to select the second communication route as described above for S140 of FIG. 2, and to initiate the second communication as described above for S150 of FIG. 2.

In some implementations, the system 600 selects the second communication route by determining at least one route, and selecting a determined route. In some implementations, the system 600 selects the second communication route based on processing of quality metrics of a feedback information (e.g., the feedback information of FIGS. 8A-B) of a plurality of feedback messages. In some implementations, the system 600 selects the second communication route based on processing of quality metrics of a feedback information (e.g., the feedback information of FIGS. 8A-B) of a plurality of feedback messages and performing a network graph search process to determine a best route by applying at least one quality heuristic/function to the quality metrics. In some implementations, the system 600 selects the second communication route by screening different routes and/or route segments based on feedback information (e.g., the feedback information of FIGS. 8A-B) of received feedback messages, as described above for FIG. 4 and S140 of FIG. 1.

In some implementations, the multi-tenant communication platform system 600 initiates the second communication (e.g., the communication 686 of FIG. 6) on behalf of a second account (e.g., "Account C" of FIG. 6) of the communication platform system 600.

4.5 Routing Communication

In some implementations, feedback for a first external system is used to route communication of a second external system. In some implementations, the multi-tenant communication platform system 600 updates the communication routing engine based on the feedback message (e.g., 688) of the first account (e.g., "Account A") (process S730), the first account is an account of a first external system (e.g., the external system 681 of FIG. 1), the system 600 initiates a second communication (e.g., the communication 686 of FIG. 6) with a second communication route (process S740), the system 600 initiates the second communication on behalf of a second account (e.g., "Account C" of FIG. 6) of the system 600, the second account is an account of a second external system (e.g., the external system 683 of FIG. 1), and the system 600 routes communication of the second external system based on the feedback message (e.g., 688) of the first account.

In some implementations, feedback for a first application is used to route communication of a second application. In some implementations, the multi-tenant communication platform system 600 updates the communication routing engine based on the feedback message of the first account, the first account is an account of an application of a first external system, the system 600 initiates a second communication with a second communication route, the system 600 initiates the second communication on behalf of a second account of the system 600, the second account is an account of an application of a second external system, and the system 600 routes communication of the application of the second external system based on the feedback message of the first account.

In some implementations, the multi-tenant communication platform system 600 routes communication of a first application (e.g., an application of the external system 681) by using feedback (e.g., 688) for the first application.

In some implementations, the multi-tenant communication platform system 600 routes communication (e.g., 687, 689) of a first external system (e.g., 681) by using feedback (e.g., 688) for the first external system.

In some implementations, the multi-tenant communication platform system 600 updates routing of the first communication (e.g., 685) by using the feedback (e.g., 688) for the first communication. In some implementations, the multi-tenant communication platform system 600 updates routing of the first communication (e.g., 685) based on the updating of the communication routing engine (process S730).

In some implementations, the multi-tenant communication platform system 600 uses feedback (e.g., 688) for a first external system (e.g., 681) to route communication (e.g., 687, 689) of the first external system (e.g., 681). In some implementations, the multi-tenant communication platform system 600 uses feedback (e.g., 688) for the first communication (e.g., 684) to update routing of the first communication (e.g., 685).

In some implementations, each feedback message (e.g., 688) includes a quality score and at least one issue of the first communication (e.g., 685).

In some implementations, the feedback message (e.g., 688) is provided by an application programming interface (API) call of a feedback API (e.g., 630) of the communication platform system 600.

4.6 Feedback Alerts

In some implementations, the method 700 includes controlling the multi-tenant communication platform system 600 to provide the eternal system (e.g., 681) of the first communication (e.g., 685) with a feedback alert that prompts the external system for feedback. Responsive to the feedback alert, the external system provides the feedback message (e.g., 688). In some implementations, the system 600 provides the feedback alert as described above for S110 of FIG. 2.

4.7 Rewards

In some implementations, the method 700 includes controlling the multi-tenant communication platform system 600 to reward the first account (e.g., "Account A" of FIG. 6) for the feedback (e.g., the feedback message 688) provided by the external system (e.g., 681) associated with the first account. In some implementations, the method 700 includes controlling the multi-tenant communication platform system 600 to reward the first account as described above for S160 of FIG. 2.

5. Feedback

In some implementations, the multi-tenant communication platform system 600 processes and stores received feedback messages (e.g., the feedback message 688 of FIG. 6). In some implementations, for each feedback message received via the feedback API 630, the system 600 obtains feedback information from the feedback message, and stores the feedback information (e.g., feedback information 1115 of FIG. 11) in a storage device (e.g., the storage medium 1105 of FIG. 11) of the system 600. In some implementations, the system 600 provides at least one external system (e.g., 681-683) access to stored feedback information. In some implementations, the system 600 provides at least one external system (e.g., 681-683) associated with a communication platform account (e.g., "Account A", "Account B", "Account C") access to stored feedback information. In some implementations, an external system (e.g., 681-683) of a communication platform account (e.g., "Account A", "Account B", "Account C") is limited with privileges for interacting with feedback of communication associated with their account. In some implementations, the feedback API 630 provides an account holder with access to the stored feedback information for at least one of setting, editing, and reading of feedback information associated with the account holder. In some implementations, the feedback API 630 provides an account holder with access to the stored feedback information for at least one of setting, editing, and reading of feedback information, regardless of the account associated with the feedback information.

FIG. 8A, shows exemplary feedback information 801 (e.g., feedback information 1115 of FIG. 11) for the first feedback message (e.g., 688 of FIG. 6) after a first iteration of the method 700. FIG. 8B, shows exemplary feedback information 801-806 (e.g., feedback information 1115 of FIG. 11) for subsequent feedback messages (e.g., 694-698) after subsequent iterations of the method 700. As shown in FIG. 8B, the feedback information 802, 803, 804, 805, and 806 correspond to the feedback messages 694, 695, 696, 697 and 698, respectively.

As shown in FIGS. 8A-B, feedback information for each feedback message includes an account identifier, a communication identifier, communication route information, a quality score, and at least one issue. In some implementations, feedback information for each feedback message includes an endpoint identifier for an endpoint that provides the feedback included in the feedback message. In some implementations, feedback information for each feedback message includes information indicating a time at which the feedback information of the feedback message is provided. In some implementations, feedback information for each feedback message includes information indicating a time at which the feedback message is provided.

As shown in FIGS. 8A-B, communication route information identifies a sequence of communication nodes of the communication route. In some implementations, each communication node is at least one of an internal routing node of the system 600 and a gateway (e.g., 671-673).

In some implementations, the feedback message is provided by an external system (e.g., 681-684), and the feedback information included in the feedback message is received via user input received for a user of the external system at a user input device. In some implementations, a user input device is included in the external system (e.g., the external system 684). In some implementations, the user input device is communicatively coupled to the external system (e.g., the external systems 681-683).

6. Routing Communications by Using the Updated Communication Routing Engine

The updated communication routing engine (updated at process S730 of the method 700) routes communications of a plurality of accounts of the communication platform (e.g., accounts of the account system 620). In some implementations, the communication routing engine 640 selects a communication route for a communication initiated at the communication platform based on the update to the communication rouging engine 640.

As an example, after receiving the first feedback message 688, the system 600 updates the communication routing engine 640 based on the feedback information shown in FIG. 8A. As shown in FIG. 8A, the communication route {C, D, E, B} has feedback information indicating a Quality Score of 3 and a "Dropped Call" for the communication 685 (of FIG. 6) of Account A.

In some implementations, for communications initiated after the system 600 updates the communication routing engine 640 based on the feedback information 801 of FIG. 8A, the communication routing engine 640 selects a communication route by weighing the communication route {C, D, E, B} less than other communication routes that have a Quality Score greater than 3. In some implementations, for communications initiated after the system 600 updates the communication routing engine 640 based on the feedback information 801 of FIG. 8A, the communication routing engine 640 selects a communication route by weighing the communication route {C, D, E, B} less than other communication routes that have a Quality Score greater than 3 or communication routes that have no feedback information.

As an example, after receiving the feedback messages 688 and 694-698, the system 600 updates the communication routing engine 640 based on the feedback information shown in FIG. 8B.

In some implementations, for communications initiated after the system 600 updates the communication routing engine 640 based on the feedback information 801-806 of FIG. 8B, the communication routing engine 640 selects a communication route by weighing the communication routes of the feedback information 802, 804 and 806 (which each have Quality Scores above 6) higher than the communication routes of feedback information 801, 803 and 805 (which each have Quality Scores below 4). In some implementations, for communications initiated after the system 600 updates the communication routing engine 640 based on the feedback information 801-806 of FIG. 8B, the communication routing engine 640 selects a communication route by weighing the communication routes of feedback information 801, 803 and 805 (which each have Quality Scores below 4) less than other communication routes that have no feedback information.

The system 600 selects a communication route for a plurality of accounts based on the received feedback message 688 (and the corresponding feedback information 801 of FIG. 8A). In other words, the external system 681 (of "Account A") provides feedback that alters routing by communication routing engine 640 for communication of other accounts of the communication platform 610. For example, the feedback message 688 alters routing by the communication routing engine 640 for communication of each of "Account A", "Account B", "Account C" and "Account D". In some implementations, the system 600 selects a communication route for all accounts of the system 600 based on the received feedback message 688 (and the corresponding feedback information 801 of FIG. 8A).

Similarly, the system 600 selects a communication route for a plurality of accounts based on the received feedback messages 688, and 694-698 (and the corresponding feedback information 801-806 of FIG. 8B). In other words, the external systems 681, 682 and 684 (of "Account A", "Account B" and "Account D", respectively) provide feedback that alters routing by communication routing engine 640 for communication of other accounts of the communication platform 610. For example, the feedback message 688 alters routing by communication routing engine 640 for communication of each of "Account A", "Account B", "Account C" and "Account D". In some implementations, the system 600 selects a communication route for all accounts of the system 600 based on the received feedback message 688, and 694-698 (and the corresponding feedback information 801-806 of FIG. 8B). In some implementations, the provided feedback alters routing by the communication routing engine 640 for communication of accounts of the communication platform 610 that have not provided feedback (e.g., "Account C" of FIG. 6). In some implementations, the provided feedback alters routing by the communication routing engine 640 for communication of accounts of the communication platform 610 that have provided feedback.

7. Isolating Feedback to a Subsection of the Routes

Figure 9:
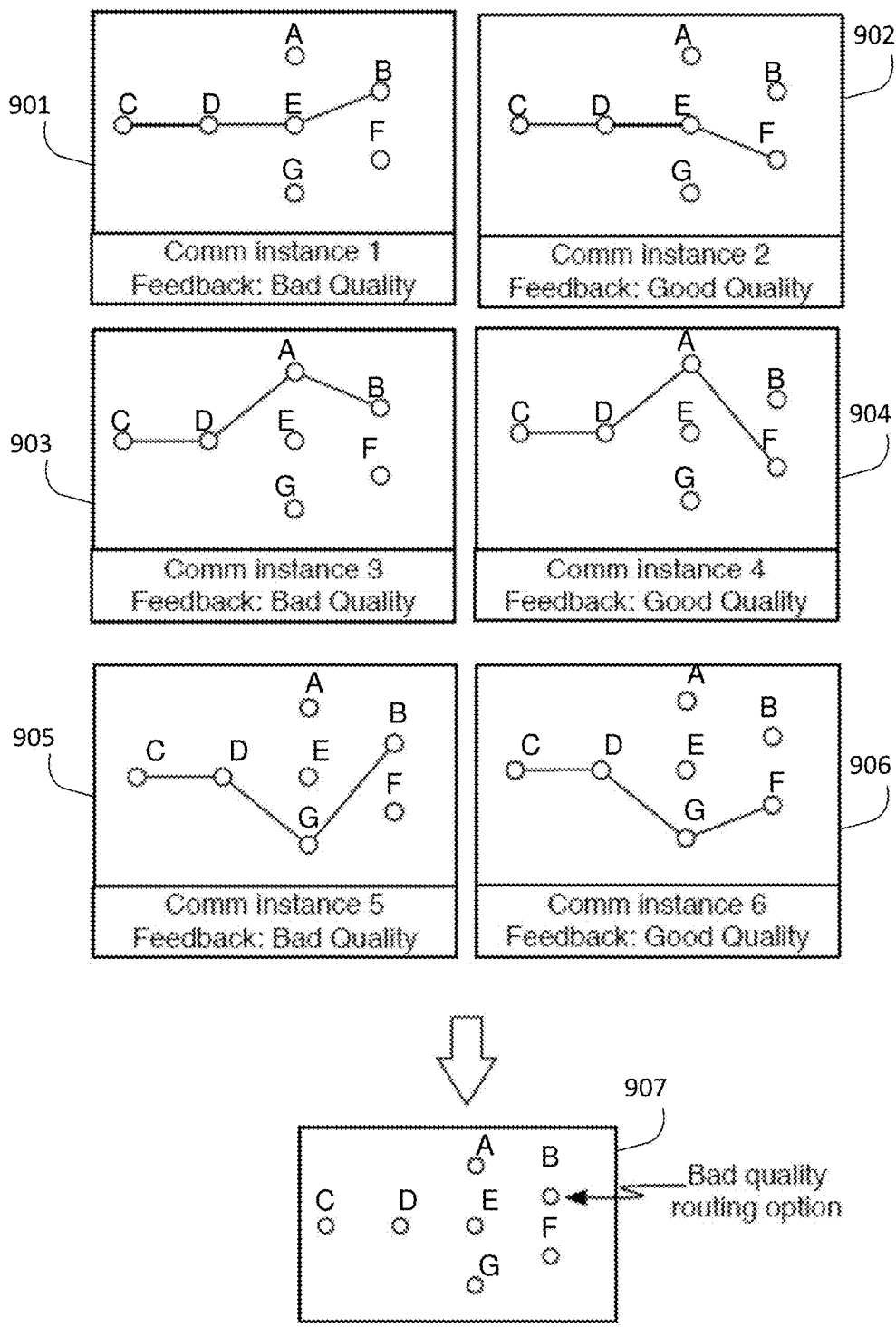
FIG. 9 is a diagram depicting isolation of feedback in accordance with an preferred embodiment.

In some implementations, the system 600 isolates feedback to a subsection of the routes. As shown in FIG. 9, feedback may be assigned to a first route, but the poor quality may not be uniquely assigned to one node of the communication route. Subsequently received feedback information can be selected to isolate feedback responsibility.

FIG. 9 shows representations 901-906 of the feedback information 801-806 of FIG. 8B. As shown in FIGS. 8B and 9, a comparison of the feedback information indicates that node B is a bad quality routing option (as indicated by the comparison result 907 of FIG. 9). Accordingly, the "Bad Quality" feedback of FIG. 9 is isolated to node B of the communication routes depicted in FIG. 9. Thus, the communication routing engine 640 can select a communication route by assigning a lower weight to communication routes that include node B.

In other words, system 600 determines feedback for a particular routing node by analyzing feedback received for communication routes that include the particular routing node. In this manner, a node responsible for poor quality feedback can be identified.

Because determination of nodes (and routes) responsible for poor quality communication depends on feedback being provided by external systems, in some implementations the system 600 provides feedback alerts to external systems, as described above for S110 of FIG. 1. Because determination of nodes (and routes) responsible for poor quality communication depends on feedback being provided by external systems, in some implementations the system 600 rewards accounts in response to providing feedback, as described above for S160 of FIG. 1.

8. Method of FIG. 10

Figure 10:
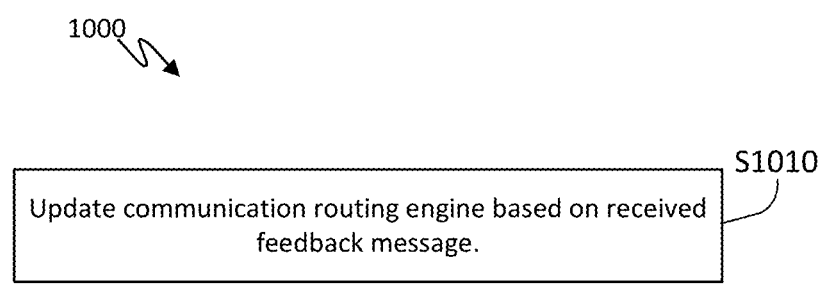
FIG. 10 is a flowchart representation of a method of a preferred embodiment.

As shown in FIG. 10, a method 1000 for updating a communication routing engine of a multi-tenant communication platform system (e.g., 600) includes, at the multi-tenant communication platform system: responsive to a feedback message (e.g., 688) provided by an external system (e.g., 681) associated with a first account (e.g., "Account A" of the account system 620) of the communication platform (e.g., 610), updating a communication routing engine (e.g., 640) of the communication platform based on the received feedback message (process S1010). The feedback message relates to a first communication (e.g., 685) initiated on behalf of the first account of the communication platform, the first communication being initiated with a first communication route. The updated communication routing engine routes communications of a plurality of accounts (e.g., "Account A", "Account B", "Account C", and "Account D" of the account system 620) of the communication platform.

In some implementations, the method 1000 is similar to the method 700.

In some implementations, process S1010 is similar to the process S730 of FIG. 7. In some implementations, the first communication is initiated as described above for the process S710. In some implementations, the feedback message is received as described above for the process S720. In some implementations, the updated communication routing engine routes communications of a plurality of accounts of the communication platform as described above for the method 700 of FIG. 7.

9. System Architecture: Communication Platform System

Figure 11:
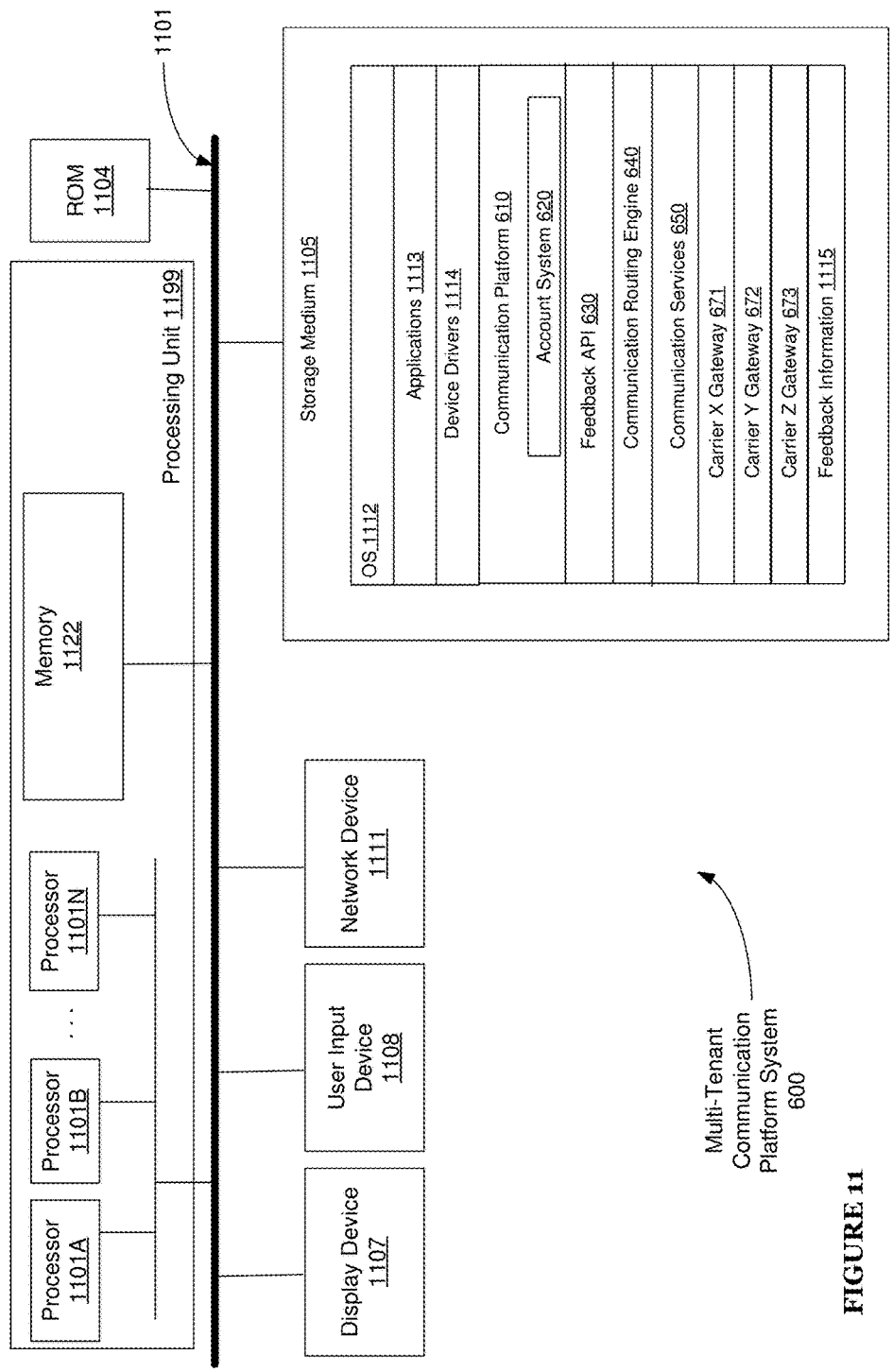
FIG. 11 is an architecture diagram of system of a preferred embodiment.

FIG. 11 is an architecture diagram of a system (e.g., the multi-tenant communication platform system 600 of FIG. 6)

according to an implementation in which the system is implemented by a server device. In some implementations, the system is implemented by a plurality of devices. In some implementations, the system 100 is similar to the system 600.

The bus 1101 interfaces with the processors 1101A-1101N, the main memory (e.g., a random access memory (RAM)) 1122, a read only memory (ROM) 1104, a processor-readable storage medium 1105, a display device 1107, a user input device 1108, and a network device 1111.

The processors 1101A-1101N may take many forms, such as ARM processors, X86 processors, and the like.

In some implementations, the system (e.g., 600) includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a communication platform, feedback API, communication routing engine, communication services, carrier gateways, and feedback information.

The network adapter device 1111 provides one or more wired or wireless interfaces for exchanging data and commands between the system (e.g., 600) and other devices, such as external systems (e.g., 681-684). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1101, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1105 includes machine-executable instructions (and related data) for an operating system 1112, software programs 1113, device drivers 1114, the communication platform 610 (and the account system 620), the feedback API 630, the communication routing engine 640, the communication services 650, the carrier gateways 671-673. In some implementations, the processor-readable storage medium 1105 includes feedback information 1115 (e.g., the feedback information 801-806 of FIG. 8B).

10. Machines

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the multi-tenant communication platform system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

11. Conclusion

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   a first external application server system receiving first user-provided communication quality feedback from a first telephony communication endpoint system and providing the first user-provided communication quality feedback to a multi-tenant telephony communication platform system;
   at the multi-tenant telephony communication platform system:
   receiving the first user-provided communication quality feedback from the first external application server system, wherein the first user-provided communication quality feedback relates to a first communication route of a first telephony communication initiated on behalf of a first platform account that is associated with the first external application server system;
   storing the first user-provided communication quality feedback in association with information that indicates the first communication route and an account identifier of the first platform account;
   receiving second user-provided communication quality feedback from the first external application server system, wherein the second user-provided communication quality feedback relates to a second communication route of a second telephony communication initiated on behalf of the first platform account;
   storing the second user-provided communication quality feedback in association with information that indicates the second communication route and the account identifier of the first platform account;
   receiving from the first external application server system a RESTful first feedback application programming interface (API) call;
   responsive to the RESTful first feedback API call, the platform system providing the first external application server system with feedback information that includes the first user-provided communication quality feedback and the second user-provided communication quality feedback, wherein the first platform account is one of a plurality of platform accounts of the platform system.

2. The method of claim 1, wherein the first feedback API call is an API call of a feedback API of the platform system.

3. The method of claim 1, wherein the first telephony communication is a telephony communication between at least two telephony communication endpoints.

4. The method of claim 1, wherein the first telephony communication is a telephony communication between at least two telephony communication endpoints, and wherein the first user-provided communication quality feedback is received by the first external application server system from an endpoint system of one of the two telephony communication endpoints, and wherein the endpoint system receives the first user-provided communication quality feedback via a user-input device of the endpoint system.

5. The method of claim 1, wherein the first telephony communication is initiated with the first communication route.

6. The method of claim 4, wherein the first external application server system is a system of a first application developer that provides a first telephony application to users of the first telephony application, and wherein the first user-provided communication quality feedback is provided by a first user of the first telephony application.

7. The method of claim 1, wherein the first user-provided communication quality feedback is included in a first feedback message received by the platform system from the first external application server system.

8. The method of claim 7, wherein the first feedback message includes the account identifier of the first platform account and an identifier of the first telephony communication.

9. The method of claim 7, further comprising: responsive to the first feedback message, the platform system updating a communication routing engine of the platform system based on the first feedback message.

10. The method of claim 9, wherein the communication routing engine is constructed to route telephony communication between at least two telephony communication endpoints, wherein the communication routing engine is constructed to route telephony communication via at least one carrier that is communicatively coupled to the platform system via at least one carrier gateway of the platform system.

11. The method of claim 9, further comprising: the updated communication routing engine routing at least a third telephony communication of a second platform account based on the first feedback message of the first platform account, wherein the third telephony communication is telephony communication between at least two telephony communication endpoints, and wherein the second platform account is associated with a second external application server system that is external to both the first external application server system and the platform system.

12. The method of claim 1, wherein the feedback information includes third user-provided communication quality feedback that relates to the first telephony communication.

13. A system comprising:
a first external application server system that is constructed to receive first user-provided communication quality feedback from a first telephony communication endpoint system and provide the first user-provided communication quality feedback to a multi-tenant telephony communication platform system;
the multi-tenant telephony communication platform hardware system, wherein the multi-tenant telephony communication platform hardware system comprises:
a processing unit constructed to execute machine-executable instructions of a storage medium of the hardware system; and
the storage medium, wherein the storage medium stores machine-executable instructions for controlling the hardware system to:
receive the first user-provided communication quality feedback from the first external application server system, wherein the first user-provided communication quality feedback relates to a first communication route of a first telephony communication initiated on behalf of a first platform account that is associated with the first external application server system,
store the first user-provided communication quality feedback in association with information that indicates the first user-provided communication route and an account identifier of the first platform account,
receive second user-provided communication quality feedback from the first external application server system, wherein the second user-provided communication quality feedback relates to a second communication route of a second telephony communication initiated on behalf of the first platform account,
store the second user-provided communication quality feedback in association with information that indicates the second communication route and the account identifier of the first platform account,
receive from the first external application server system a RESTful first feedback application programming interface (API) call,
responsive to the RESTful first feedback API call, provide the first external application server system with feedback information that includes the first user-provided communication quality feedback and the second user-provided communication quality feedback, and
wherein the first platform account is one of a plurality of platform accounts of the hardware system.

14. The method of claim 1, wherein the first user-provided communication quality feedback is feedback received by the first external application server system via a user-input device of first telephony communication endpoint system.

15. The method of claim 1, wherein the first user-provided communication quality feedback includes at least one of a quality score and a communication issue for the first telephony communication, and wherein the second user-provided communication quality feedback includes at least one of a quality score and a communication issue for the second telephony communication.

16. The method of claim 15, wherein the first user-provided communication quality feedback includes communication route information for the first communication route, and wherein the second user-provided communication quality feedback includes communication route information for the second communication route.

17. The method of claim 15, wherein the feedback information provided by the platform system to the first external application server system includes: the first user-provided communication quality feedback, communication route information for the first communication route, the second user-provided communication quality feedback, and communication route information for the second communication route.

18. The system of claim 13, wherein the first user-provided communication quality feedback includes at least one of a quality score and a communication issue for the first telephony communication, and wherein the second user-provided communication quality feedback includes at least one of a quality score and a communication issue for the second telephony communication.

19. The system of claim 18, wherein the first user-provided communication quality feedback includes communication route information for the first communication route, and wherein the second user-provided communication quality feedback includes communication route information for the second communication route.

20. The system of claim 18, wherein the feedback information provided by the system to the first external application server system includes: the first user-provided communication quality feedback, communication route information for the first communication route, the second user-provided communication quality feedback, and communication route information for the second communication route.

* * * * *